US008809607B2

(12) United States Patent
Yao et al.

(10) Patent No.: US 8,809,607 B2
(45) Date of Patent: Aug. 19, 2014

(54) CO-PRODUCTION OF RENEWABLE DIESEL AND RENEWABLE GASOLINE

(75) Inventors: Jianhua Yao, Bartlesville, OK (US); Edward L. Sughrue, II, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 611 days.

(21) Appl. No.: 13/226,707

(22) Filed: Sep. 7, 2011

(65) Prior Publication Data

US 2012/0088945 A1   Apr. 12, 2012

Related U.S. Application Data

(60) Provisional application No. 61/390,916, filed on Oct. 7, 2010.

(51) Int. Cl.
| | | |
|---|---|---|
| C07C 1/00 | (2006.01) | |
| C10L 1/04 | (2006.01) | |
| C10G 3/00 | (2006.01) | |
| C10G 45/08 | (2006.01) | |
| B01J 23/883 | (2006.01) | |

(52) U.S. Cl.
CPC ... *C10G 3/52* (2013.01); *C10L 1/04* (2013.01); *C10G 3/46* (2013.01); *C10G 2300/1014* (2013.01); *B01J 23/883* (2013.01); *C10G 3/48* (2013.01); *C10G 2300/1055* (2013.01); *C10G 45/08* (2013.01); *C10G 2300/1051* (2013.01); *C10G 3/49* (2013.01); *C10G 2300/1018* (2013.01); *Y02E 50/13* (2013.01); *C10G 2300/1074* (2013.01)
USPC .............................. 585/240; 585/242; 44/605

(58) Field of Classification Search
USPC ...................................... 585/240, 242; 44/605
See application file for complete search history.

(56) References Cited

U.S. PATENT DOCUMENTS

| | | | |
|---|---|---|---|
| 4,338,472 A | 7/1982 | Sirkar | |
| 4,496,780 A | 1/1985 | Arena | |
| 4,503,278 A | 3/1985 | Chen et al. | |
| 6,291,725 B1 | 9/2001 | Chopade et al. | |
| 6,479,713 B1 | 11/2002 | Werpy et al. | |
| 6,543,210 B2 | 4/2003 | Rostoucher et al. | |
| 6,787,023 B1 | 9/2004 | Mohr et al. | |
| 6,841,085 B2 | 1/2005 | Werpy et al. | |
| 7,321,052 B2 * | 1/2008 | Miller et al. | 560/231 |
| 2004/0074760 A1 | 4/2004 | Portnoff et al. | |
| 2007/0142633 A1 | 6/2007 | Yao et al. | |
| 2007/0175795 A1 | 8/2007 | Yao et al. | |
| 2008/0302001 A1 | 12/2008 | Koivusalmi et al. | |
| 2010/0212219 A1* | 8/2010 | Siochi et al. | 44/388 |
| 2010/0228068 A1 | 9/2010 | O'Connor et al. | |
| 2010/0331558 A1* | 12/2010 | Kao et al. | 554/124 |

FOREIGN PATENT DOCUMENTS

| | | |
|---|---|---|
| WO | 2008113041 | 9/2008 |
| WO | 2009025635 | 2/2009 |

OTHER PUBLICATIONS

PCT/US2011-050645 PCT International Search Report (Form PCT/ISA/210) Dated Jul. 9, 2011.
Chianelli, et al., "Periodic trends in hydrodesulfurization: in support of the Sabatier principle", Applied Catalysis, A, vol. 227, pp. 83-96 (2002).
Davda, et al., "A Review of Catalytic Issues and Process Conditions for Renewable Hydrogen and Alkanes by Aqueous-Phase Reforming of Oxygenated Hydrocarbons Over Supported Metal Catalysts," Appl. Catal. B., 56, 171 (2004).
Hamada and Watabe, "More Propylene in FCC Units" Catalyst Research Center, JGC Catalysts and Chemicals Ltd. (2008).
Huber, et al., "Renewable Alkanes by Aqueous-Phase Reforming of Biomass-Derived Oxygenates" Angew. Chem. Int. Ed., 43, 1549 (2004).
Huber, et al.; "Production of Liquid Alkanes by Aqueous-Phase Processing of Biomass-Derived Carbohydrates", Science, 308, 1446-1450 (2005).
Metzger, "Production of Liquid Hydrocarbons from Biomass," Angew. Chem. Int. Ed., 45, 696 (2006).

* cited by examiner

*Primary Examiner* — Nina Bhat
(74) *Attorney, Agent, or Firm* — Phillips 66 Company

(57) ABSTRACT

A process for co-production of renewable diesel fuel range hydrocarbons and gasoline fuel range hydrocarbons from biomass-derived oils and fatty materials (e.g. triglycerides, diglycerides, monoglycerides, and free fatty acids) and biomass-derived polyol (e.g. sorbitol, xylitol, trehalose, sucrose, and sugar alcohol), respectively, in a same refinery hydrotreater with or without co-feeding of diesel fuel range hydrocarbons.

25 Claims, No Drawings

US 8,809,607 B2

CO-PRODUCTION OF RENEWABLE DIESEL AND RENEWABLE GASOLINE

CROSS-REFERENCE TO RELATED APPLICATIONS

This application is a non-provisional application which claims benefit under 35 USC §119(e) to U.S. Provisional Application Ser. No. 61/390,916 filed Oct. 7, 2010 entitled "CO-PRODUCTION OF RENEWABLE DIESEL AND RENEWABLE GASOLINE," which is incorporated herein in its entirety.

STATEMENT REGARDING FEDERALLY SPONSORED RESEARCH

None.

FIELD OF THE DISCLOSURE

The present disclosure relates generally to a hydrotreating process to convert renewable resources into transportation fuels.

BACKGROUND OF THE INVENTION

There is a national interest in the discovery of alternative sources of fuels and chemicals that are not derived from petroleum resources. As the public discussion concerning the availability of petroleum resources and the need for alternative sources continues to grow, it is anticipated that future government mandates will require transportation fuels to include, at least in part, hydrocarbons derived from sources besides petroleum. As such, there is a need to develop alternative sources for hydrocarbons useful for producing fuels and chemicals.

One possible alternative source of hydrocarbons for producing fuels and chemicals is the natural carbon found in plants and animals, such as for example, oils and fats. These so-called "natural" carbon resources (or renewable hydrocarbons) are widely available, and remain a target alternative source for the production of hydrocarbons.

It is known that oils and fats can be processed and used as fuel. "Bio Diesel" is one such product and may be produced by subjecting a base vegetable oil to a transesterification process using methanol in order to convert the base oil to desired methyl esters. After processing, the products produced have very similar combustion properties as compared to petroleum-derived hydrocarbons. However, the use of Bio-Diesel as an alternative fuel has not yet been proven to be cost effective. In addition, Bio-Diesel often exhibits "gelling" thus making it unable to flow, which limits its use in pure form in cold climates.

U.S. Pat. No. 7,550,634, which is herein incorporated by reference in its entirety, describes a process for the conversion of biomass derived oils or fatty materials such as triglycerides, diglycerides, monoglycerides, and free fatty acids into diesel fuel range hydrocarbons using a refinery hydrotreater. In this technology, triglycerides (oils/fats) are hydrotreated to remove the oxygen from the triglycerides molecule to produce the linear hydrocarbons (also named as renewable diesel).

It is also known that biomass carbohydrates can be processed and used as fuel. Biomass carbohydrates and other sugar-based feedstocks have been used to produce ethanol, which has been used in gasohol and other energy applications.

U.S. Pat. No. 7,678,950, which is herein incorporated by reference in its entirety, describes a process for converting biomass (such as carbohydrates, starches, lignins, and other biomass) into gasoline range hydrocarbons (also named as renewable gasoline). In this technology, cellulose and hemi-cellulose (e.g. carbohydrates, starches, and lignins) as two major constituents in the biomass may be broken down to C6 and C5 sugars (e.g. glucose, lactose, fructose, sucrose, and dextrose) using for example acid or enzyme hydrolysis processes. The carbonyl groups of C6 and C5 sugars can be further catalytically hydrogenated to produce a polyalcohol including sorbitol ($C_6H_{14}O_6$) sugar alcohols using a commercial process. It was demonstrated that the sugar alcohols, such as sorbitol, can be further hydrogenated to C6 hydrocarbons (renewable gasoline) using a hydrotreating process. In addition, ZSM-5 zeolite catalyst has also been used to convert a sorbitol/water/isopentane mixture to gasoline hydrocarbons (US2007142633, incorporated by reference in its entirety).

BRIEF SUMMARY OF THE DISCLOSURE

The present disclosure demonstrates a process for co-production of 1) diesel fuel range hydrocarbons and 2) gasoline fuel range hydrocarbons from 1) biomass-derived oils and fatty materials (e.g. triglycerides, diglycerides, monoglycerides, and free fatty acids) and 2) biomass-derived polyol (e.g. sorbitol, xylitol, trehalose, sucrose, and sugar alcohol), respectively, in a same refinery hydrotreater with or without co-feeding of diesel fuel range hydrocarbons.

In one embodiment of the invention, there is provided a process for co-production of renewable diesel fuel range hydrocarbons and renewable gasoline fuel range hydrocarbons comprising a) providing a feedstock A comprising at least one biomass derived oils and fatty materials, b) providing a feedstock B comprising at least one biomass derived polyol, and c) contacting the feedstock A and the feedstock B with a hydrotreating catalyst in the presence of hydrogen in a reaction zone under a reaction condition sufficient for i) converting at least a portion of the at least one biomass derived oils and fatty materials into one or more diesel fuel range hydrocarbons product, and ii) converting at least a portion of the at least one biomass derived polyol into one or more gasoline fuel range hydrocarbons product.

In another embodiment of the invention, there is provided a process for co-production of renewable diesel fuel range hydrocarbons and renewable gasoline fuel range hydrocarbons comprising a) providing a feedstock A comprising at least one biomass derived oils and fatty materials, b) providing a feedstock B comprising at least one biomass derived polyol, c) providing a feedstock C comprising at least one fuel oil, and d) contacting the feedstock A, the feedstock B, and the feedstock C with a hydrotreating catalyst in the presence of hydrogen in a reaction zone under a reaction condition sufficient for i) converting at least a portion of the at least one biomass derived oils and fatty materials into one or more diesel fuel range hydrocarbons product, and ii) converting at least a portion of the at least one biomass derived polyol into one or more gasoline fuel range hydrocarbons product.

In yet another embodiment of the current invention, there is provided a process for co-production of renewable diesel fuel range hydrocarbons and renewable gasoline fuel range hydrocarbons comprising a) providing a feedstock A comprising at least one biomass derived oils and fatty materials, b) providing a feedstock B comprising at least one biomass derived polyol, c) providing a feedstock C comprising at least one fuel oil, and d) contacting the feedstock A, the feedstock B, and the feedstock C with a hydrotreating catalyst in the presence of hydrogen in a reaction zone under a reaction condition sufficient for i) converting at least a portion of the at least one biomass derived oils and fatty materials into one or more diesel fuel range hydrocarbons product, and ii) converting at least a portion of the at least one biomass derived polyol into one or more gasoline fuel range hydrocarbons product, wherein the one or more diesel fuel range hydrocarbons product from step d) may be used as at least part of the feedstock C in step c).

It has been unexpectedly discovered in a lab unit that oils/fats and polyols can be co-fed into same hydrotreater to co-produce renewable diesel and renewable gasoline.

One advantage of co-processing both biomass derived oils/fats and polyols is the flexibility to select the feedstocks (oils/fats, polyols or the combination of both) to process based on the economic situation (e.g. diesel/gasoline prices).

Another advantage of co-processing both biomass derived oils/fats and polyols is that, because of the flexibility of selecting feedstocks and using the same hydrotreating reactor, the downtown time of the hydrotreater will be eliminated or significantly reduced compare to the down time of the hydrotreater when switching between the two normal independent hydrotreating processes.

A further advantage of co-processing both biomass derived oils/fats and polyols is in that the hydrogen consumption is generally much higher in the process of hydrotreating the polyols than in the process of hydrotreating oils/fats. Co-processing both biomass derived oils/fats and polyols allows a better hydrogen distribution along the catalyst bed and better utilization of the availability H2 in the reactor.

A yet further advantage of co-processing both biomass derived oils/fats and polyols is in that the excess heat released from polyols hydrotreating process may be recaptured to heat up the oils/fats for the hydrotreating process where by the energy savings are realized through the disclosed novel process.

In addition, in the polyols hydrotreating process, significant amount water was fed to and generated in the reactor. It is necessary to co-feeding a hydrocarbon stream, such as diesel, with polyols to protect the hydrotreating catalyst from steam damage. The currently disclosed co-processing method made it possible to eliminate co-feeding hydrocarbon stream, because the renewable diesel produced in the process can serve the function of the hydrocarbon stream.

BRIEF DESCRIPTION OF THE DRAWINGS

None

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow According to the current inventive process, biomass-derived oils and fatty materials and biomass-derived polyol may be co-processed by contacting a catalyst in a reaction zone with or without co-feeding of fuel oil under a reaction condition sufficient to produce a reaction product containing diesel boiling-range hydrocarbons and gasoline boiling-range hydrocarbons.

Biomass-derived oils and fatty materials useful for the process disclosed herein generally include triglycerides, diglycerides, monoglycerides, and free fatty acids. As used herein, the term "fatty material" refers to a product that comprises a fatty acid or residue thereof. In certain embodiments, the fatty material is selected from the group consisting of triglycerides, diglycerides, monoglycerides, and free fatty acids.

The term, "triglyceride," is used generally to refer to any naturally occurring ester of a fatty acid and/or glycerol having the general formula $CH_2(OCOR_1)CH(OCOR_2)CH_2(OCOR_3)$ where $R_1$, $R_2$ and $R_3$ are the same or different, and may vary in chain length. Di- and monoglycerides comprise one or two fewer ester moieties, respectively. In certain embodiments, the fatty material, especially the triglyceride compound, is selected from the group consisting of vegetable oil, yellow grease (such as used restaurant oil or those derived from used cooking oils), animal fats, and mixtures thereof. Vegetable oils, such as for example, canola and soybean oils contain triglycerides with three fatty acid chains. Useful triglycerides in the present invention include, but are not limited to, triglycerides that may be converted to hydrocarbons when contacted under suitable reaction conditions. Examples of triglycerides useful in the present invention include, but are not limited to, vegetable oils including soybean and corn oil, peanut oil, sunflower seed oil, coconut oil, babassu oil, grape seed oil, poppy seed oil, almond oil, hazelnut oil, walnut oil, olive oil, avocado oil, sesame oil, tall oil, cottonseed oil, palm oil, rice bran oil, canola oil, cocoa butter, shea butter, butyrospermum, wheat germ oil, illipse butter, meadowfoam, seed oil, rapeseed oil, borange seed oil, linseed oil, castor oil, vernoia oil, tung oil, jojoba oil, ongokea oil, yellow grease (for example, as those derived from used cooking oils), and animal fats (such as tallow animal fat, beef fat, and milk fat, and the like and mixtures and combinations thereof). The triglyceride is selected from the group consisting of vegetable oil, yellow grease (used restaurant oil), animal fats, and combinations of any two or more thereof.

The biomass-derived polyol feedstocks for the hydrotreating reactions are aqueous solutions containing a variety of biological compounds including but are not limited to Glycol, Glycerol, Erythritol, Threitol, Arabitol, Ribitol, Xylitol, Allitol, Dulcitol, Galactitol, Iditol, Mannitol, Sorbitol, Isomalt, Lactitol, Maltitol, Trehalose, Sucrose, Sugar Alcohol, isomer and combinations thereof.

Hydrotreating biomass-derived polyol feedstocks according to the current disclosure allow the production of hydrocarbons (e.g. gasoline) inexpensively while incorporating renewable fuels into current markets. These hydrocarbons include gasoline boiling range hydrocarbons that boil between approximately minus 20° C. to 220° C., between approximately minus 20° C. to 120° C., between approximately minus 20° C. to 196° C., between approximately 35° C. to 160° C., and between approximately 140° C. to 220° C. Some examples of gasoline boiling range hydrocarbons include toluene, xylene, pentane, trimethylbenzenes, benzene, butane, ethylbenzene, heptane, cyclohexane, hexane, octane, ethanol, naphthalene, trimethylbenzene 1,2,4, isopentane, styrene, methyl tert-butyl ether (MTBE), ethyl tert-butyl ether, tertiary amyl-methyl ether, alkanes, cycloalkanes, alkenes, and aromatic hydrocarbons.

Fuel oil feedstock useful in the present disclosure generally may contain a variety of fuels including but are not limited to jet fuel, kerosene, diesel fuel, light cycle oil, vacuum gas oil, heating oil, and etc. Diesel fuel is a commonly a mixture of diesel range hydrocarbon products. Diesel fuels include petro-diesel, bio-diesel, synthetic diesel, blended diesel, and combinations thereof. Diesel fuel may also be supplied through a variety of sources either within or delivered to the refinery. Market price and availability are used to determine the fuel feedstock of choice. Typically the fuel with the lowest overall cost including direct cost, transportation, process modification, processing and any other costs that may be associated with the fuel oil feedstock. The fuel oil feedstock may be heated to reaction temperature prior to contacting the hydrotreating catalyst. By co-processing polyol and oils/fat feedstocks with diesel fuels, less expensive commercial grade catalysts may be used on a commercial scale at increased temperatures and pressures while remaining active and without fouling.

The diesel fuel range hydrocarbon product according to the current disclosure generally comprises long chain carbon compounds having 10-30 or more carbon atoms per molecule, especially those selected from the group consisting of C10-C30 hydrocarbons and combinations thereof.

According to one aspect of the current disclosure, the diesel fuel range hydrocarbon product may be used as at least part of the feedstock fuel oil according to one embodiment of the disclosure where a co-feeding of diesel fuel range hydrocarbons are employed.

Useful catalyst compositions in the present invention include hydrotreating catalysts that contain Co, Mo, W, Ni, Pt, Ru and Pd, that are effective in the conversion of biomass-derived oils and fatty materials and biomass-derived polyols to hydrocarbons when contacted under suitable reaction conditions. This conversion may take place in a conventional hydrotreating reactor.

The amount of the biomass-derived oils and fatty materials feedstocks, the biomass-derived polyols feedstocks, the fuel oil feedstock (if presence) according to the current disclosure may vary depending on the size of the commercial process or suitability of the mixing/reaction vessel. Generally, the ratio of the biomass-derived oils fatty materials feedstocks to the biomass-derived polyols feedstocks is 0.1%-99.9% to 99.1-0.1%. In one embodiment where the fuel oil feedstocks is present, the ratio of the biomass-derived oils fatty materials feedstocks to the biomass-derived polyols feedstocks and to the fuel oil feedstocks is 10:1:0.1 to 0.1:1:10

The biomass-derived oils and fatty materials feedstock according to the current disclosure may contain between 0.1 and 100% w/w oils and fatty material in diesel. The biomass-derived polyol feedstock according to the current disclosure may contain between 0.1 and 95% w/w polyol in water.

"Catalysts" as described herein are commercial grade hydrotreating catalysts used by petroleum industries in refining processes. The term "hydrotreating catalyst" as used herein, generally describes a catalyst that is capable of utilizing hydrogen to accomplish saturation of unsaturated materials, such as aromatic compounds. Most metals catalyze hydrotreating including transition metals such as cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), and the noble metals including platinum (Pt), iridium (Ir), palladium (Pd), osmium (Os), rhodium (Rh) and ruthenium (Ru) along with other metal compounds. Binary combinations of cobalt and molybdenum, nickel and molybdenum, and nickel and tungsten are also highly active. Commercial grade catalysts include Cobalt-Molybdenum (Co/Mo), Nickel-Molybdenum (Ni/Mo), Titanium-Molybdenum (Ti/Mo), Nickel-Tungsten (Ni/W), Cobalt (Co), Molybdenum (Mo), Copper (Cu), Iron (Fe), combinations thereof and other commercially available hydrotreating catalysts. Noble metal catalysts, including Platinum (Pt), Palladium (Pd), and Ruthenium (Ru) catalysts may also be used. Hydrotreating catalysts are also available as bimetallic catalysts including Co/Mo, Co/W, Ni/Mo, Ni/W, Ti/Mo, Ti/W, or any mixtures of the above catalysts.

Catalysts are supported on an alumina, silica, titania, zeolite, carbon or other support materials. The catalysts may also be unsupported including commercially available unsupported Co/Mo, Co/W, Ni/Mo, Ni/W, Ti/Mo, Ti/W, Co/Mo/W, Ni/Mo/W, Ti/Mo/W and or any mixtures of the above catalysts.

The catalysts may also be a highly active catalyst including unsupported Co/Mo, Co/W, Ni/Mo, Ni/W, Ti/Mo, Ti/W, Co/Mo/W, Ni/Mo/W, Ti/Mo/W and or any mixtures of the above catalysts.

Commercial refining catalysts, including highly active catalysts, supported catalyst, and custom catalysts with a variety of activities and properties, are readily available from a variety of sources including ADVANCED REFINING TECHNOLOGIES (ART), ALBEMARLE, PGM CATALYSTS & CHEMICALS, AMERICAN ELEMENTS, EURECAT, FISCHER, HALDOR TOPSOE, HEADWATER, SIGMA, and other chemical suppliers. Catalysts may be micro-sized, nanosized, fluidized or other catalyst forms dependent upon the reactor size, shape and conditions under which the reaction is run.

One of ordinary skill in the art may select a catalyst based on composition, structure and charge to achieve specific activity from the catalyst. Although selection of a catalyst and activity is highly predictable because the reaction is based on the surface structure of the catalyst, the rate of reaction and overall productivity may vary dependent upon the reactants, reaction conditions, and flow rate.

A steady supply of hydrogen is required for the hydrotreating process of biomass-derived oils and fatty materials and biomass-derived polyol. Although hydrogen may be available from other sources, it is frequently expensive and energy intensive. According to the current disclosure, to improve the efficiency and decrease the cost of hydrotreating process, $H_2$ is produced in a separate reactor by steam reforming the one or more gasoline fuel range hydrocarbons product produced from hydrotreating biomass-derived oils and fatty materials and biomass-derived polyol with or without co-feeding of diesel fuel range hydrocarbons.

According to the current disclosure, the biomass-derived oils and fatty materials feedstock and the biomass-derived polyol feedstock, with or without co-feeding of diesel fuel range hydrocarbons, is contacted with the hydrotreating catalyst within a reaction zone under conditions sufficient for converting at least a portion of the at least one oil and fatty material and at least one polyol present in the feed into one or more diesel fuel range hydrocarbons product and one or more gasoline fuel range hydrocarbons product.

The reaction is carried out in a reaction zone in any suitable type of apparatus or reaction chamber which enable intimate contact of the reactants and control of the operating conditions. The process may be carried out in batch, semi-continuous, or continuous operation. The biomass-derived oils and fatty materials feedstock, the biomass-derived polyol feedstock, and fuel oils stock may be added to the reaction vessel in any suitable manner or in any suitable order.

The hydrotreating process can be conducted at an approximate temperature of between about 300° F. to 850° F. Temperature across the reaction zone may vary by 10 to 50° F. dependent upon the volume or size of the reaction zone, thermal conductance of the vessel material, heat capacity of the reaction and other reaction conditions. Fahrenheit temperatures (° F.) may be converted to Celsius (° C.) through a simple conversion ($T_C$=0.56 ($T_F$−32)=5/9 ($T_F$−32)) thus 400° F. is approximately 200° C., and 1000° F. is approximately 540° C.

The pressure in the reaction zone is generally between about 100 psig to about 3000 psig. The reaction pressure may be expressed in terms of 1 atm=1.01325 bar=101.3 kPa=14.696 psi (lbf/in2)=760 mmHg=10.33 mH2O=760 torr=29.92 in Hg=1013 mbar=1.0332 kgf/cm2=33.90 ftH2O. Thus a gauge pressure (g) of 500 psig is equivalent to approximately 25 atm. Pressures during hydrotreating may vary dependent upon the viscosity, flow rates, catalyst density, temperature, air pressure, and other factors. The pressure may vary from 10-50 psig at lower pressures or 50-250 psig at higher pressures. Thus a reaction at 500 psig may be at approximately 500° psig, but pressures may vary between 450 psig and 550 psig. A reaction at about 3000 psig may vary between 2750 psig and 3250 psig during the course of the reaction. Temporary spikes or drops in pressure will not dramatically reduce overall activity of the hydrotreating process.

The time of reaction will depend upon the specific starting material, concentration, the specific catalyst used, pressure and temperature. Generally, the liquid hourly space velocity is in the range of from about 0.1 to about 10 $hr^{-1}$, which may be lower or higher depending on the desired conversion.

The following examples of certain embodiments of the invention are given. Each example is provided by way of explanation of the invention, one of many embodiments of the invention, and the following examples should not be read to limit, or define, the scope of the invention.

Experiments demonstrated that hydrotreating a mixture of an aqueous solution of sorbitol, a feedstock of tallow in diesel, and a co-feedstock of diesel over a commercial hydrotreating catalyst produces both diesel boiling range and gasoline boiling range hydrocarbons.

Example

Tests were run over a commercially available NiMo hydrotreating catalyst with a Feed A consisting of 50% Tallow/50% Diesel, Feed B consisting of 70% Sorbitol/30% H20, and a co-feedstock of diesel in a hydrotreater.

TABLE 1

Co-processing of Sorbitol and Tallow to produce both gasoline and diesel range hydrocarbons.

|  | Test I | Test II |
|---|---|---|
| Hydrotreating Catalyst | KF-848 NiMo (12 ml) | DN-3551 NiMo (10.55) |
| Temperature (° C.) | 335 | 320 |
| Pressure (psig) | 1200 | 1200 |
| Feed A | 50% Tallow/50% Diesel | 50% Tallow/50% Diesel |
| Feed B | 70% Sorbitol/30% H20 | 70% Sorbitol/30% H20 |
| Feed A feeding rate (ml/hr) | 12 | 12 |
| Feed B feeding rate (ml/hr) | 6 | 6 |
| H2 feeding rate (ml/hr) | 220 | 200 |
| Feed A Conversion rate (%) | 99.96 | 99.7 |
| Feed B Conversion rate (%) | 98.9 | 81.7 |
| Product | Both diesel and gasoline range hydrocarbons | Both diesel and gasoline range hydrocarbons |

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 6,543,210 (Rostoucher; Peterschmitt; Vallat); "Cutting machine with improved cutting mechanism" (2001).
2. U.S. Pat. No. 4,338,472, "Catalytic Hydrogenolysis of Alditols to Produce Polyols" Hydrocarbon Research Inc. (1985).
3. U.S. Pat. No. 4,496,780, "Hydrocracking of Polyols," UOP Inc., Arena (1985).
4. U.S. Pat. No. 4,503,278, "Process for converting carbohydrates to hydrocarbons," Mobil Oil Corp., Chen and Koenig (1985).
5. U.S. Pat. No. 6,291,725, "Catalysts and Process for Hydrogenolysis of Sugar Alcohols to Polyols," Battelle, (2001).
6. U.S. Pat. No. 6,479,713, "Hydrogenolysis of 5-Carbon Sugars, Sugar Alcohols, and Other Methods and Compositions for Reactions Involving Hydrogen" Battelle, (2002).
7. U.S. Pat. No. 6,787,023, "Metal-containing macrostructures of porous inorganic oxide, preparation thereof, and use" ExxonMobil Patents, Mohr, et al. (2004).
8. U.S. Pat. No. 6,841,085, "Hydrogenolysis of 6-Carbon Sugars and Other Organic Compounds" Battelle, (2005).
9. US2007142633, "Process for Converting Carbohydrates to Hydrocarbons" ConocoPhillips, (2007).
10. Chianelli, et al., "Periodic trends in hydrodesulfurization: in support of the Sabatier principle", Applied Catalysis, A, volume 227, pages 83-96 (2002).
11. Davda, et al., "A Review of Catalytic Issues and Process Conditions for Renewable Hydrogen and Alkanes by Aqueous-Phase Reforming of Oxygenated Hydrocarbons Over Supported Metal Catalysts," Appl. Catal. B., 56, 171 (2004).
12. Hamada and Watabe, "More Propylene in FCC Units" Catalyst Research Center, JGC Catalysts and Chemicals Ltd. (2008).
13. Huber, et al., "Renewable Alkanes by Aqueous-Phase Reforming of Biomass-Derived Oxygenates'" Angew. Chem. Int. Ed., 43, 1549 (2004).
14. Huber, et al.; "Production of Liquid Alkanes by Aqueous-Phase Processing of Biomass-Derived Carbohydrates", Science, 308, 1446-1450 (2005).
15. Metzger, "Production of Liquid Hydrocarbons from Biomass," Angew. Chem. Int. Ed., 45, 696 (2006).

The invention claimed is:

1. A process for co-production of renewable diesel fuel range hydrocarbons and renewable gasoline fuel range hydrocarbons comprising:
    a) providing a feedstock A comprising at least one biomass derived oils and fatty materials,
    b) providing a feedstock B comprising at least one biomass derived polyol, and
    c) contacting said feedstock A and said feedstock B with a hydrotreating catalyst in the presence of hydrogen in a reaction zone under a reaction condition sufficient for
        i) converting at least a portion of said at least one biomass derived oils and fatty materials into one or more diesel fuel range hydrocarbons product, and
        ii) converting at least a portion of said at least one biomass derived polyol into one or more gasoline fuel range hydrocarbons product.

2. The process of claim 1, wherein said reaction condition comprises:
    a) a reaction temperature of between about 300 and 850° F.; and
    b) a reaction pressure of between about 100 and 3000 psig.

3. The process of claim 1, wherein said feedstock B comprises: a biomass derived polyol selected from the group consisting of Glycol, Glycerol, Erythritol, Threitol, Arabitol, Ribitol, Xylitol, Allitol, Dulcitol, Galactitol, Iditol, Mannitol, Sorbitol, Isomalt, Lactitol, Maltitol, Trehalose, structural isomers, and combinations thereof.

4. The process of claim 1, wherein:
    a) feedstock A is a mixture solution comprising between 0.1 and 100% oils and fatty material in diesel;
    b) feedstock B is an aqueous solution comprising between 0.1 and 95% polyols in water
    c) the ratio of said feedstock A to said feedstock B is from 0.1%-99.9% to 99.9-0.1%
    d).

5. The process of claim 1, wherein said one or more gasoline fuel range hydrocarbons product is steam reformed in a separate reactor for producing hydrogen to be used in hydrotreating said biomass-derived oils and said fatty materials and biomass-derived polyol.

6. The process of claim 1, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru) and any combinations thereof.

7. The process of claim 1, wherein said hydrotreating catalyst is an highly active catalyst selected from the group consisting of Co/Mo, Co/W, Ni/Mo, Ni/W, Ti/Mo, Ti/W, Co/Mo/W, Ni/Mo/W, Ti/Mo/W and any combinations thereof.

8. The process of claim 1, wherein said feedstock A comprises: at least one biomass derived oils and fatty materials selected from the group consisting of vegetable oils, yellow grease, animal fats and any mixtures thereof.

9. A process for co-production of renewable diesel fuel range hydrocarbons and renewable gasoline fuel range hydrocarbons comprising:
    a) providing a feedstock A comprising at least one biomass derived oils and fatty materials,
    b) providing a feedstock B comprising at least one biomass derived polyol,
    c) providing a feedstock C comprising at least one fuel oil, and
    d) contacting said feedstock A, said feedstock B, and said feedstock C with a hydrotreating catalyst in the presence of hydrogen in a reaction zone under a reaction condition sufficient for
        i) converting at least a portion of said at least one biomass derived oils and fatty materials into one or more diesel fuel range hydrocarbons product, and
        ii) converting at least a portion of said at least one biomass derived polyol into one or more gasoline fuel range hydrocarbons product.

10. The process of claim 9, wherein said biomass derived oils and fatty materials is selected from the group consisting of vegetable oils, yellow grease, animal fats and any mixtures thereof.

11. The process of claim 9, wherein said reaction condition comprises:
    a) a reaction temperature of between about 300 and 850° F.; and
    b) a reaction pressure of between about 100 and 3000 psig.

12. The process of claim 9, wherein:
    said biomass derived polyol is selected from the group consisting of Glycol, Glycerol, Erythritol, Threitol, Arabitol, Ribitol, Xylitol, Allitol, Dulcitol, Galactitol, Iditol, Mannitol, Sorbitol, Isomalt, Lactitol, Maltitol, Trehalose, structural isomers, and combinations thereof.

13. The process of claim 9, wherein said fuel oil feedstock is selected from the group consisting of jet fuel, kerosene, diesel fuel, light cycle oil (LCO), vacuum gas oil, heating oil, petro-diesel, bio-diesel, synthetic diesel, blended diesel and any combinations thereof.

14. The process of claim 9, wherein said feedstocks comprise:
    a) feedstock A is a mixture solution comprising between 0.1 and 100% (by volume) oils and fatty material in diesel;
    b) feedstock B is an aqueous solution comprising between 0.1 and 95% (by volume) polyols in water,
    c) the ratio of said feedstock A to said feedstock B is from 0.1%-99.9% to 99.9-0.1;
    d) the ratio of said feedstock A to said feedstock B to said feedstock C is from 10:1:0.1 to 0.1:1:10
    e).

15. The process of claim 9, wherein said one or more gasoline fuel range hydrocarbons product is steam reformed in a separate reactor for producing hydrogen to be used in hydrotreating said biomass-derived oils and said fatty materials and biomass-derived polyol.

16. The process of claim 15, wherein said hydrotreating catalyst is an highly active catalyst selected from the group consisting of Co/Mo, Co/W, Ni/Mo, Ni/W, Ti/Mo, Ti/W, Co/Mo/W, Ni/Mo/W, Ti/Mo/W and any combinations thereof.

17. The process of claim 9, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru) and any combinations thereof.

18. The process of claim 9, wherein said hydrotreating catalyst is an highly active catalyst selected from the group consisting of Co/Mo, Co/W, Ni/Mo, Ni/W, Ti/Mo, Ti/W, Co/Mo/W, Ni/Mo/W, Ti/Mo/W and any combinations thereof.

19. A process for co-production of renewable diesel fuel range hydrocarbons and renewable gasoline fuel range hydrocarbons comprising:
   a) providing a feedstock A comprising at least one biomass derived oils and fatty materials,
   b) providing a feedstock B comprising at least one biomass derived polyol,
   c) providing a feedstock C comprising at least one fuel oil, and
   d) contacting said feedstock A, said feedstock B, and said feedstock C with a hydrotreating catalyst in the presence of hydrogen in a reaction zone under a reaction condition sufficient for
      i) converting at least a portion of said at least one biomass derived oils and fatty materials into one or more diesel fuel range hydrocarbons product, and
      ii) converting at least a portion of said at least one biomass derived polyol into one or more gasoline fuel range hydrocarbons product,
   wherein said one or more diesel fuel range hydrocarbons product from step d) may be is used as at least part of said feedstock C in step c).

20. The process of claim 19, wherein said reaction condition comprises:
   a) a reaction temperature of between about 300 and 850° F.; and
   b) a reaction pressure of between about 100 and 3000 psig.

21. The process of claim 19, wherein:
   a) the biomass derived polyol is selected from the group consisting of Glycol, Glycerol, Erythritol, Threitol, Arabitol, Ribitol, Xylitol, Allitol, Dulcitol, Galactitol, Iditol, Mannitol, Sorbitol, Isomalt, Lactitol, Maltitol, Trehalose, structural isomers and combinations thereof;
   b) the biomass derived oils and fatty materials is selected from the group consisting of vegetable oils, yellow grease, animal fats and any mixtures thereof.

22. The process of claim 19, wherein said fuel oil feedstock is selected from the group consisting of jet fuel, kerosene, diesel fuel, light cycle oil (LCO), vacuum gas oil, heating oil, petro-diesel, bio-diesel, synthetic diesel, blended dieseland any combinations thereof.

23. The process of claim 19, wherein:
   a) feedstock A is a mixture solution comprising between 0.1 and 100% oils and fatty material in diesel;
   b) feedstock B is an aqueous solution comprising between 0.1 and 95% polyols in water;
   c) the ratio of said feedstock A to said feedstock B is from 0.1%-99.9% to 99.9-0.1%;
   d) the ratio of said feedstock A to said feedstock B to said feedstock C is 10:1:0.1 to 0.1:1:10
   e).

24. The process of claim 19, wherein said one or more gasoline fuel range hydrocarbons product is steam reformed in a separate reactor for producing hydrogen to be used in hydrotreating said biomass-derived oils and said fatty materials and biomass-derived polyol.

25. The process of claim 19, wherein said hydrotreating catalyst is selected from the group consisting of cobalt (Co), molybdenum (Mo), nickel (Ni), titanium (Ti), tungsten (W), zinc (Zn), antimony (Sb), bismuth (Bi), cerium (Ce), vanadium (V), niobium (Nb), tantalum (Ta), chromium (Cr), manganese (Mn), rhenium (Re), iron (Fe), platinum (Pt), iridium (Ir), palladium (Pd), osmium (Os), rhodium (Rh), ruthenium (Ru) and any combinations thereof.

* * * * *